(12) United States Patent
Neff et al.

(10) Patent No.: US 10,711,915 B2
(45) Date of Patent: Jul. 14, 2020

(54) PILOT ACTUATED CONTROL PILOT FOR OPERATING VALVE

(71) Applicant: MAC Valves, Inc., Wixom, MI (US)

(72) Inventors: Robert Neff, Bloomfield Village, MI (US); Matthew Neff, Birmingham, MI (US); Jeff Simmonds, Commerce Township, MI (US); Eric Janssen, Howell, MI (US); Joseph Richardson, Milford, MI (US)

(73) Assignee: MAC Valves, Inc., Wixom, MI (US)

( * ) Notice: Subject to any disclaimer, the term of this patent is extended or adjusted under 35 U.S.C. 154(b) by 28 days.

(21) Appl. No.: 16/196,318

(22) Filed: Nov. 20, 2018

(65) Prior Publication Data

US 2020/0158255 A1 May 21, 2020

(51) Int. Cl.
*F16K 31/40* (2006.01)
*F16K 31/124* (2006.01)
*F16K 31/122* (2006.01)
*F16K 11/07* (2006.01)

(52) U.S. Cl.
CPC .......... *F16K 31/406* (2013.01); *F16K 31/124* (2013.01); *F16K 31/1221* (2013.01); *F16K 31/1245* (2013.01); *F16K 11/07* (2013.01); *Y10T 137/86582* (2015.04); *Y10T 137/86694* (2015.04)

(58) Field of Classification Search
CPC .. F16K 31/406; F16K 31/124; F16K 31/1245; F16K 31/1221
USPC ............................ 251/29; 137/625.6, 625.67
See application file for complete search history.

(56) References Cited

U.S. PATENT DOCUMENTS 2,665,708 A * 1/1954 Ghormley ............. F16K 31/406
137/493
2,931,388 A 4/1960 Renick et al.
(Continued)

FOREIGN PATENT DOCUMENTS

DE 2526492 A1 12/1976
DE 3813020 A1 11/1989
JP S6279825 A 4/1987

OTHER PUBLICATIONS

MAC Pulse Valve PV03 Series Brochure (5 Pages) issued by MAC Valves on Aug. 30, 2016.
(Continued)

*Primary Examiner* — Umashankar Venkatesan
(74) *Attorney, Agent, or Firm* — Harness, Dickey & Pierce, P.L.C.

(57) ABSTRACT

A pulse valve assembly including a main valve and two pilot valves. The main valve includes a main valve body, main valve bore, and main valve spool. The main valve body includes an inlet port, an outlet port, and a pressure chamber at one end of the main valve bore. A first pilot valve selectively supplies pressurized fluid to the second pilot valve depending on the position of a poppet, which is controlled by a solenoid. A second pilot valve includes a spool that is driven by pressurized fluid from the first pilot valve. The second pilot valve selectively supplies pressurized fluid to the pressure chamber in the main valve causing the main valve spool to move towards the open or closed position. When the main valve spool is in the open position, pressurized fluid can flow through the main valve from the inlet port to the outlet port.

20 Claims, 7 Drawing Sheets

(56) References Cited

U.S. PATENT DOCUMENTS

| | | | | |
|---|---|---|---|---|
| 2,981,287 A * | 4/1961 | Caslow | ............... | F15B 13/0431 |
| | | | | 137/625.63 |
| 2,993,510 A * | 7/1961 | Collins | ................. | F16K 11/07 |
| | | | | 137/625.64 |
| 3,502,108 A * | 3/1970 | Merilatt | ............... | F15B 13/043 |
| | | | | 137/625.6 |
| 3,540,480 A * | 11/1970 | Malinowski | ............ | F15B 13/04 |
| | | | | 137/625.6 |
| 4,175,589 A * | 11/1979 | Nakamura | .......... | F15B 13/0431 |
| | | | | 137/625.6 |
| 4,266,572 A * | 5/1981 | Schuttenberg | ...... | F15B 13/0402 |
| | | | | 137/625.63 |
| 4,543,875 A * | 10/1985 | Imhof | ................ | F15B 13/0402 |
| | | | | 137/625.63 |
| 4,938,118 A * | 7/1990 | Wolfges | ............. | G05D 16/2024 |
| | | | | 91/361 |
| 5,248,123 A | 9/1993 | Richeson et al. | | |
| 5,615,710 A * | 4/1997 | Sato | ................... | F15B 13/0402 |
| | | | | 137/625.64 |
| 5,988,214 A | 11/1999 | Tajima et al. | | |
| 7,735,518 B2 * | 6/2010 | Williams | ............ | F15B 13/0402 |
| | | | | 137/596.15 |
| 8,453,678 B2 * | 6/2013 | Neff | ...................... | F16K 31/408 |
| | | | | 137/625.64 |
| 10,221,868 B2 * | 3/2019 | Matsumoto | ........... | F16K 31/122 |
| 2013/0105014 A1 * | 5/2013 | Brooks | ............... | F15B 13/0402 |
| | | | | 137/625.6 |
| 2014/0299799 A1 * | 10/2014 | Fukano | ............... | F16K 31/1221 |
| | | | | 251/28 |

OTHER PUBLICATIONS

MAC Pulse Valve PV06 Series Brochure (5 Pages) issued by MAC Valves on Aug. 30, 2016.

MAC PV09 Pulse Valve Brochure (4 Pages) issued by MAC Valves on Sep. 12, 2016.

MAC Valves Dust Collection Solutions / MAC Pulse Valves Flier (2 Pages) issued by MAC Valves on Feb. 17, 2015.

European Search Report and related opinion for Application No. 19208024.0 dated Mar. 17, 2020.

* cited by examiner

PILOT ACTUATED CONTROL PILOT FOR OPERATING VALVE

FIELD

The present disclosure relates to pulse valve assemblies, which may be adapted for use in dust collectors or plastic blow molding machines.

BACKGROUND

This section provides background information related to the present disclosure which is not necessarily prior art.

Pulse valve assemblies are commonly used in dust collectors for cleaning purposes. Dust collectors are used in a wide variety of applications to collect environmental dust, saw dust, and other particulates. Typical dust collectors have one or more filter elements that remove and trap dust that is suspended in the fluid flow (e.g., air flow) passing through the dust collector. As a result, the fluid flow exiting the dust collector is substantially free of dust and/or other particulates. Pulse valve assemblies are used in dust collectors to provide a pulse or burst of high velocity fluid flow (e.g., air), which creates a pressure wave that acts on the one or more filter elements of the dust collector to knock or blow dust and/or other particulates off of the filter element(s). For example, in some systems, the dust collector is configured such that the pulse of air supplied by the pulse valve assembly causes the filter element(s) to rapidly expand and then contract to its initial state. The dust and/or other particulate that has accumulated on or in the filter element(s) falls off the filter element(s) and into a container in the dust collector when this rapid expansion and contraction occurs, cleaning the filter element(s). This cleaning process can occur while the dust collector remains running. The pulse valve assembly is controlled to provide pulses of air at predetermined intervals to keep the filter element(s) clean.

MAC Valves, Inc. makes pulse valve assemblies for dust collectors. One of MAC Valves' prior pulse valve designs includes a main valve with a spool that is driven by a single, solenoid operated pilot valve. This pilot valve includes a valve member that moves when the solenoid is energized to open the pilot valve. When this occurs, pressurized fluid supplied by the pilot valve acts on the spool of the main valve causing it to slide to an open position. When the spool of the main valve is in the open position, a pulse of pressurized fluid flows through the main valve and ultimately to the dust collector.

SUMMARY

This section provides a general summary of the disclosure, and is not a comprehensive disclosure of its full scope or all of its features.

In accordance with one aspect of the subject disclosure, an improved pulse valve assembly is provided that includes a main valve and two pilot valves. In accordance with this pulse valve assembly design, a first pilot valve drives a second pilot valve and the second pilot valve drives the main valve.

The main valve includes a main valve body, a main valve bore, and a main valve spool. The main valve bore extends within the main valve body. The main valve spool is disposed in the main valve bore and can move (i.e., slide) inside the main valve bore between a closed position and an open position. The main valve body includes an inlet port, an outlet port, and a pilot inlet passage. The inlet port, the outlet port, and the pilot inlet passage in the main valve body are each disposed in fluid communication with the main valve bore. The main valve body has at least one pressure chamber at one end of the main valve bore and at least one pilot outlet passage disposed in fluid communication with the at least one pressure chamber. When pressurized fluid accumulates in the pressure chamber, it applies a force to the main valve spool, which causes the main valve spool to move towards either the open position or the closed position depending on the configuration of the pressure chamber and the main valve spool. The main valve spool includes a main valve member that is configured to block fluid flow between the inlet port and the outlet port when the main valve spool is in the closed position and permit fluid flow from the inlet port to the outlet port when the main valve spool is in the open position.

The first pilot valve includes a first pilot valve body, a first pilot valve bore, and a poppet. The first pilot valve bore extends within the first pilot valve body. The poppet is disposed in the first pilot valve bore and can move (i.e., slide) inside the first pilot valve bore between at least two axially spaced positions. Movement of the poppet is driven by an electric solenoid. The first pilot valve body includes a first pilot inlet for receiving pressurized fluid and at least one outlet for discharging pressurized fluid.

The second pilot valve includes a second pilot valve body, a second pilot valve bore, and a pilot valve spool. The second pilot valve body is connected to the main valve body and the second pilot valve bore extends within the second pilot valve body. The pilot valve spool is disposed in the second pilot valve bore and can move (i.e., slide) inside the second pilot valve bore between a first position and a second position. The second pilot valve body includes at least one end chamber at one end of the second pilot valve bore. The second pilot valve body also has a second pilot inlet and at least one outlet port. The second pilot inlet is disposed in fluid communication with the pilot inlet passage in the main valve body and the at least one outlet port of the second pilot valve is disposed in fluid communication with the at least one pilot outlet passage in the main valve body.

The first pilot valve is connected to the second pilot valve body with the at least one end chamber of the second pilot valve disposed in fluid communication with the at least one outlet of the first pilot valve such that the pressurized fluid from the first pilot valve drives the pilot valve spool of the second pilot valve between the first and second positions. The pilot valve spool of the second pilot valve includes at least one valve member that is configured to open and close at least one fluid flow path extending from the second pilot inlet to the at least one pilot outlet passage when the pilot valve spool moves back and forth between the first and second positions. When the fluid flow path is open, pressurized fluid accumulates in the pressure chamber in the main valve causing the main valve spool to move towards either the open position or the closed position.

Advantageously, by using a first pilot valve to drive (i.e., pilot) a second pilot valve, which then drives (i.e., pilots) the main valve, movement of the main valve spool can be controlled more quickly for a faster response time, and in turn, a consistently higher impact force that the pulse of high velocity fluid (e.g., air) applies to the one or more filter elements of the dust collector. As a result, each pulse provides better (i.e., more complete) cleaning of the one or more filter elements with the same amount (or less) energy. This means that pulses of high velocity fluid (e.g., air) can be applied to the dust collector less frequently, saving energy and reducing electricity costs. It also allows the dust collector to operate more efficiently.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
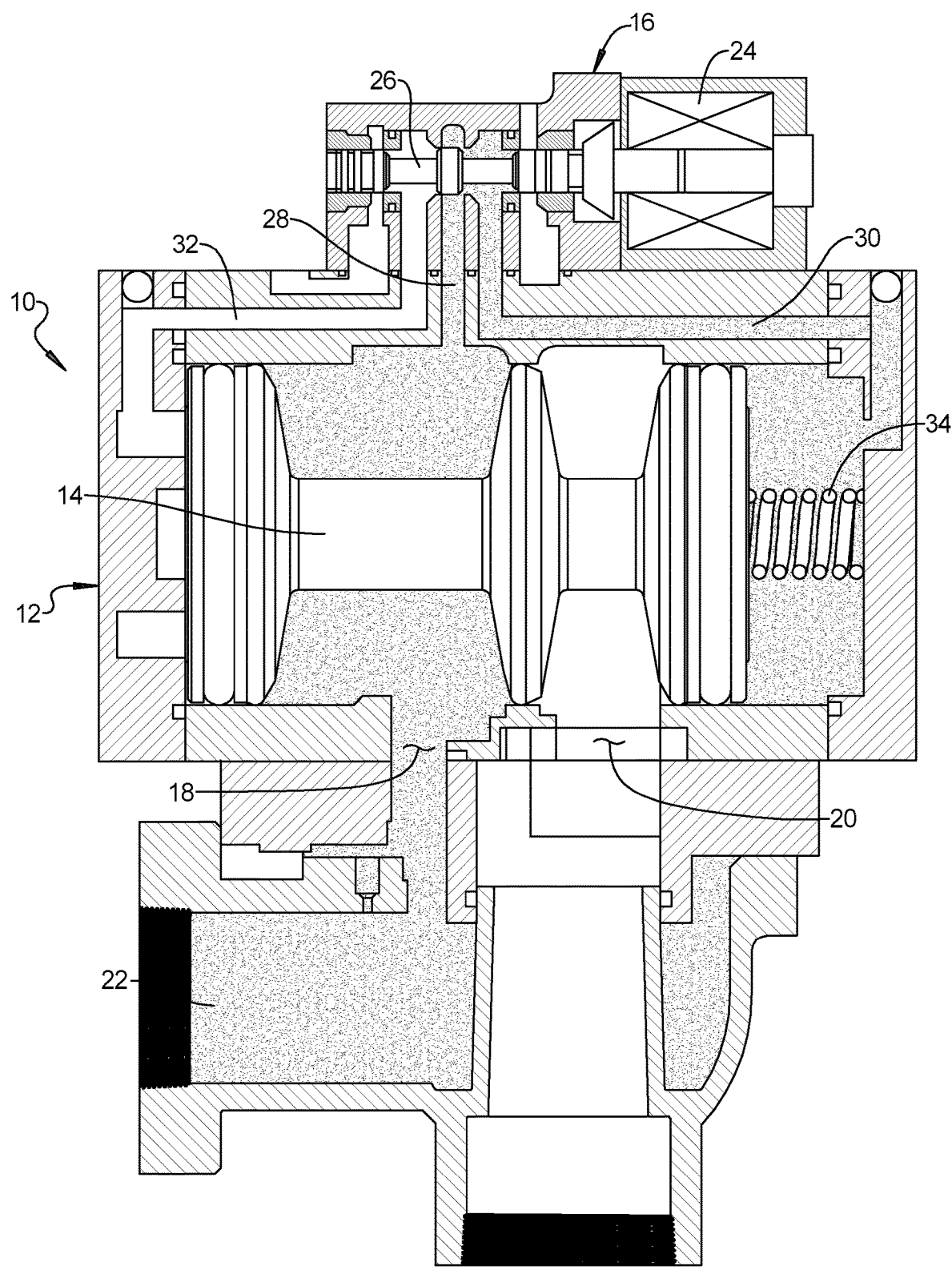
FIG. 1 is a side section view of a prior art pulse valve assembly where the pulse valve assembly is shown in a closed position.

Referring to the Figures, wherein like numerals indicate corresponding parts throughout the several views, several pulse valve assemblies 10, 40, 40' are illustrated.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to," "connected to" or "coupled to" another element or layer, it may be directly on, engaged, connected or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
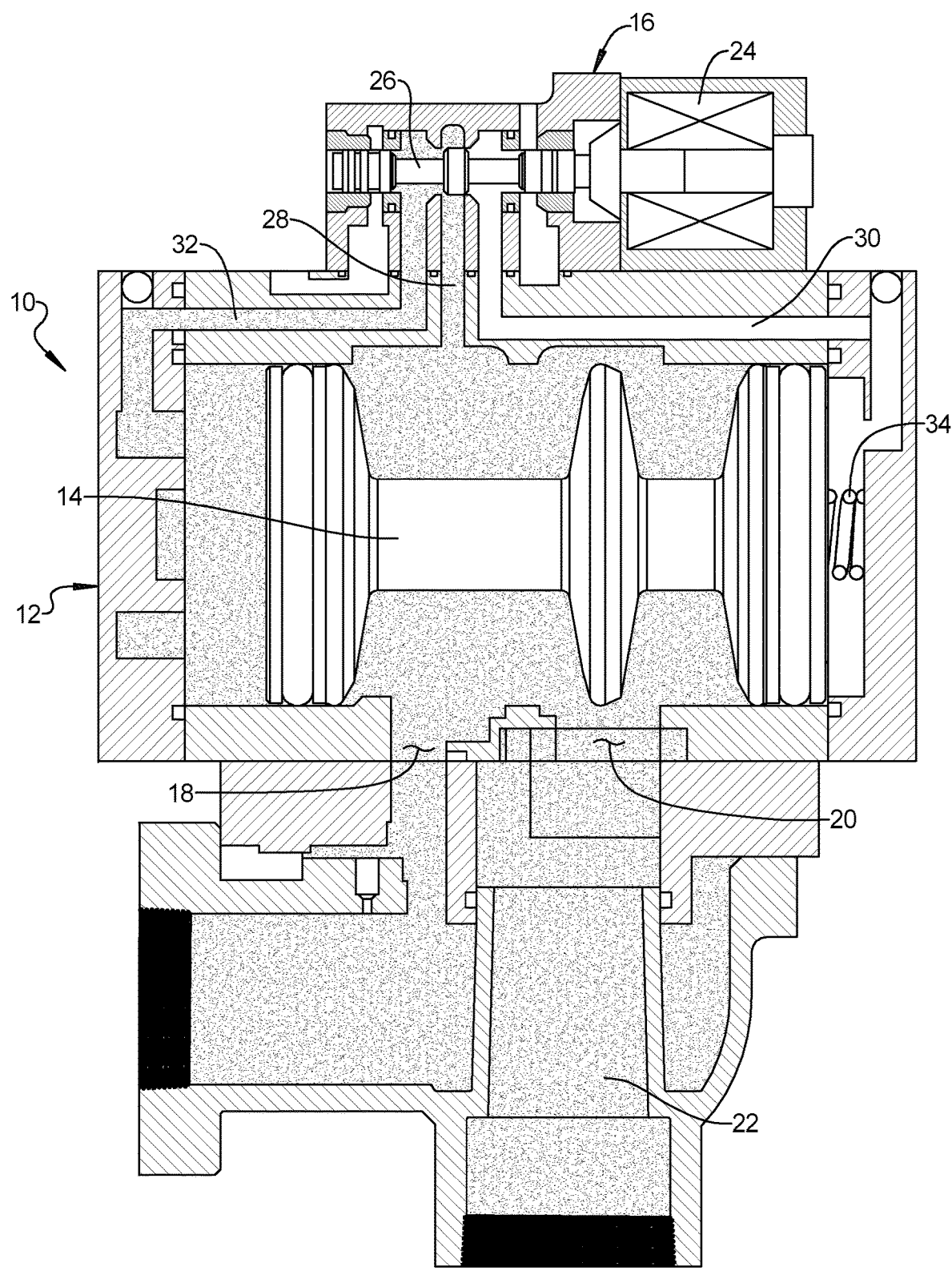
FIG. 2 is a side section view of the prior art pulse valve assembly illustrated in FIG. 1 where the pulse valve assembly is shown in an open position.
Figure 3:
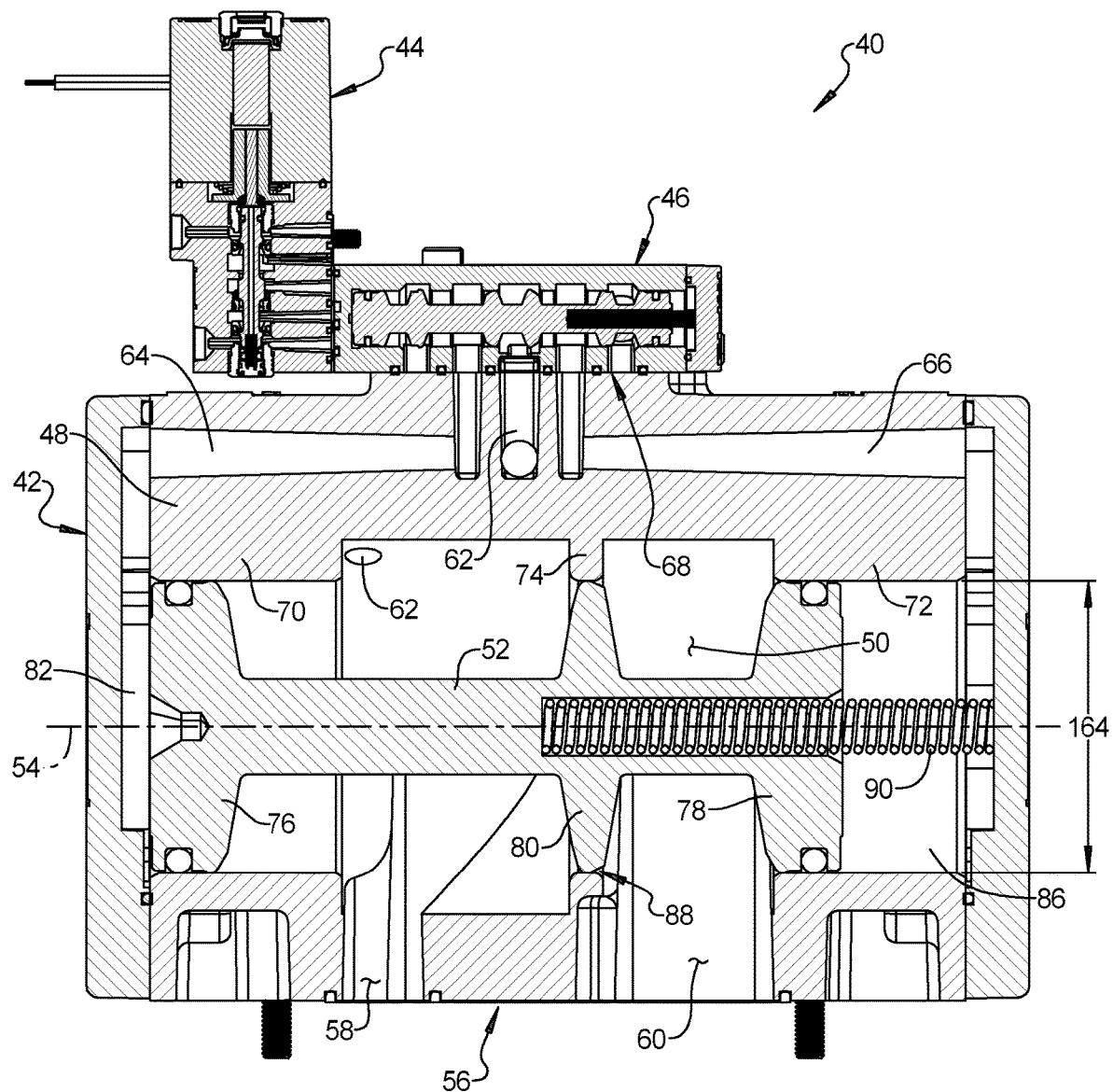
FIG. 3 is a side section view of an exemplary pulse valve assembly constructed in accordance with the teachings of the present disclosure.

With reference to FIGS. 1 and 2, a prior art pulse valve assembly 10 is illustrated. The pulse valve assembly 10 includes a main valve 12 with a spool 14 that is driven by a single, solenoid operated pilot valve 16. The spool 14 moves between a closed position (FIG. 1) and an open position (FIG. 2). The main valve 12 has an inlet port 18 and an outlet port 20. In the closed position (FIG. 1), the spool 14 prevents pressurized fluid 22 (e.g., air) from flowing through the main valve 12 from the inlet port 18 to the outlet port 20. In the open position (FIG. 2), pressurized fluid (e.g., air) can flow through the main valve 12 from the inlet port 18 to the outlet port 20. Movement of the spool 14 is driven by the pilot valve 16.

The pilot valve 16 includes a solenoid 24 and a valve member 26. The valve member 26 moves when the solenoid 24 is energized. Pressurized fluid 22 is supplied to the pilot valve 16 via a pilot inlet passage 28. When the solenoid 24 is not energized (FIG. 1), the pressurized fluid 22 flows from the pilot inlet passage 28, through the pilot valve 16, and into a normally open passage 30 in the main valve 12. The pressurized fluid 22 in the normally open passage 30 acts on the spool 14 of the main valve 12 and holds the spool 14 in the closed position. When the solenoid 24 is energized (FIG. 2), the pressurized fluid 22 flows from the pilot inlet passage 28, through the pilot valve 16, and into a normally closed passage 32 in the main valve 12. The pressurized fluid 22 in the normally closed passage 32 acts on the spool 14 of the main valve 12 causing the spool 14 to slide to the open position. When the spool 14 of the main valve 12 is in the open position, a pulse of pressurized fluid 22 flows through the main valve 12 and ultimately to an accessory device (not shown) such as a dust collector or plastic blow molding machine. A spring 34 biases the spool 14 towards the closed position (FIG. 1). As a result, the main valve 12 operates as a two-way, normally closed valve.

Figure 4:
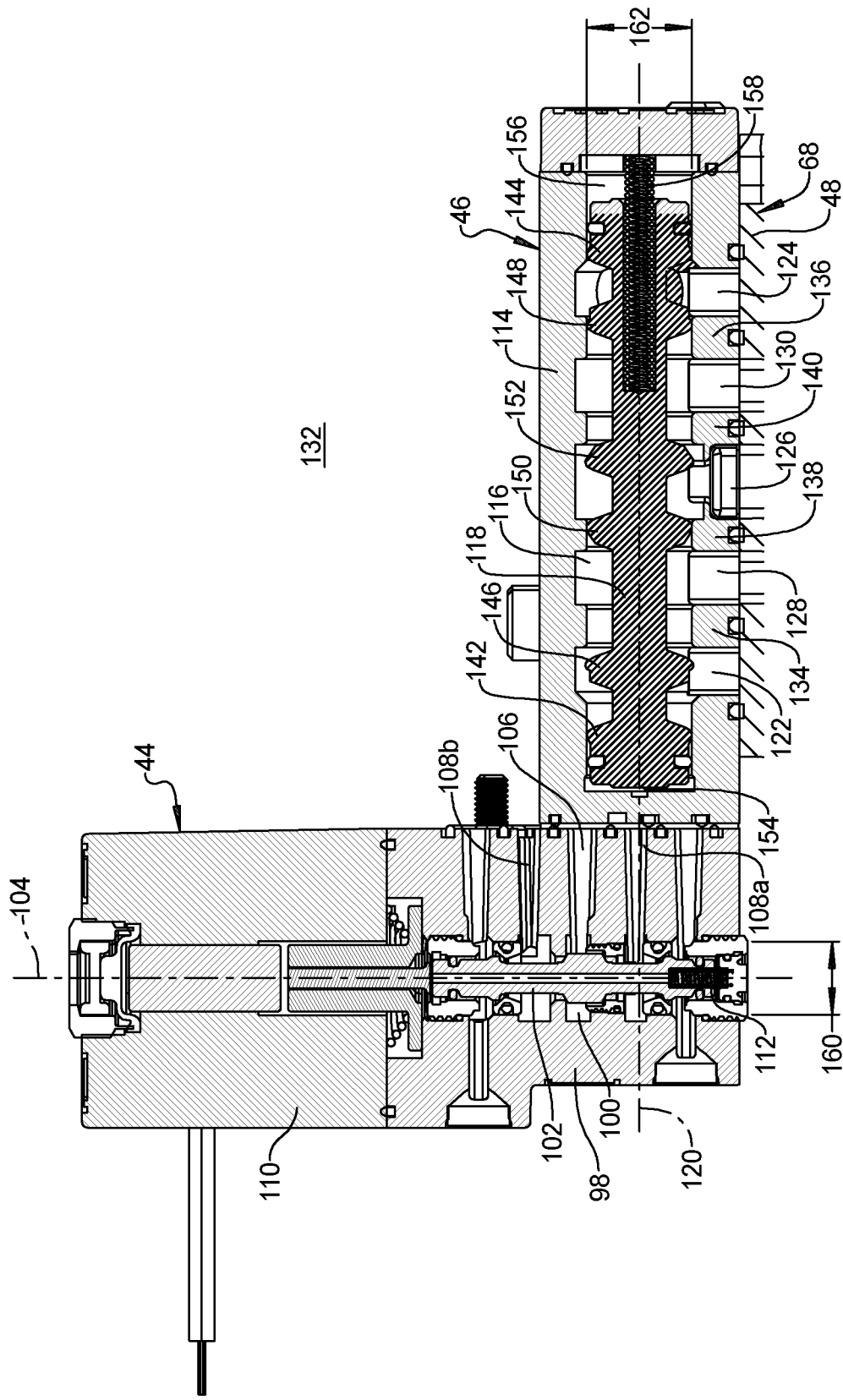
FIG. 4 is an enlarged side section view of a first pilot valve and a second pilot valve of the exemplary pulse valve assembly illustrated in FIG. 3.
Figure 5:
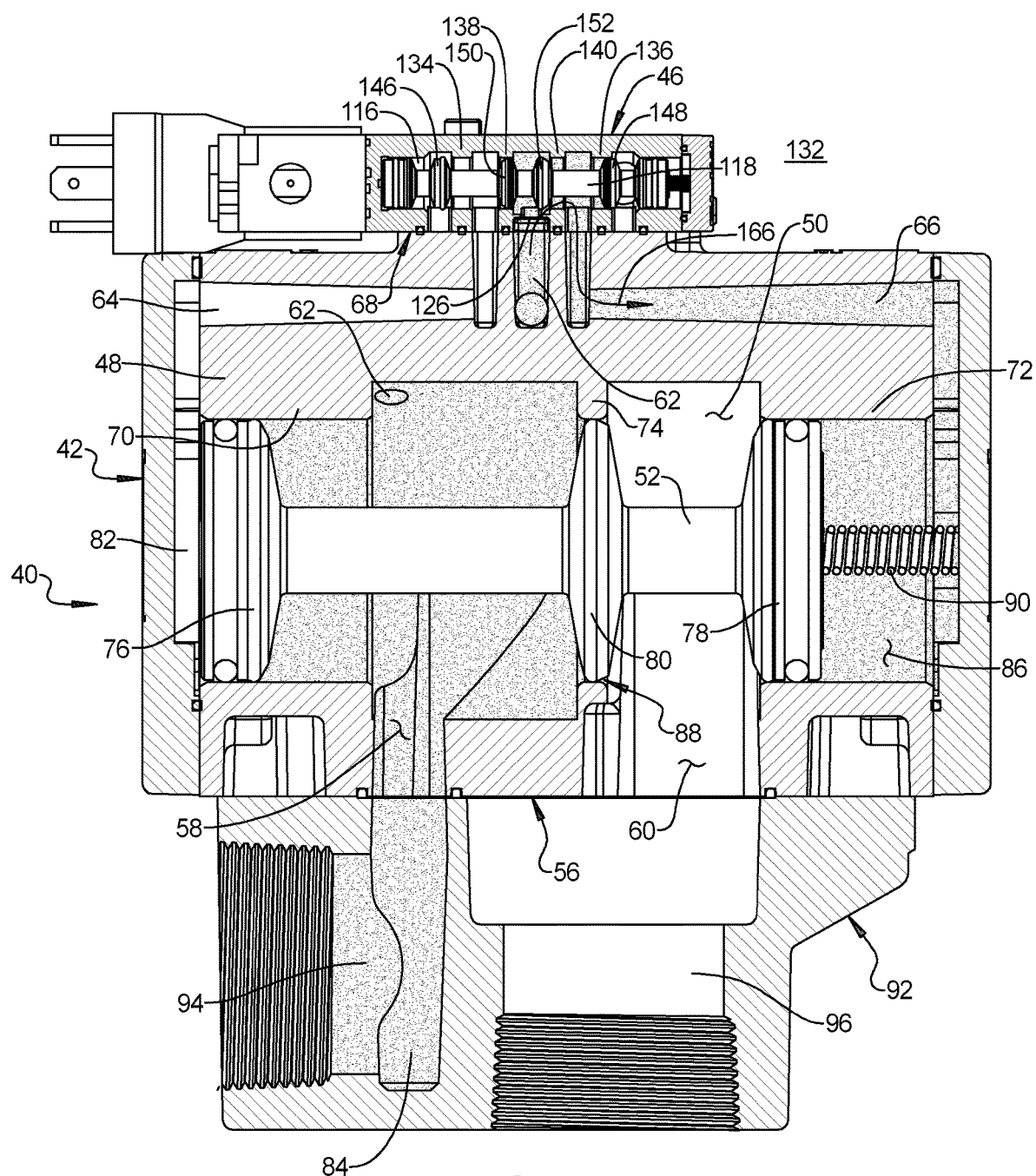
FIG. 5 is a side section view of the exemplary pulse valve assembly illustrated in FIG. 3 where the pulse valve assembly is shown in a closed position.
Figure 6:
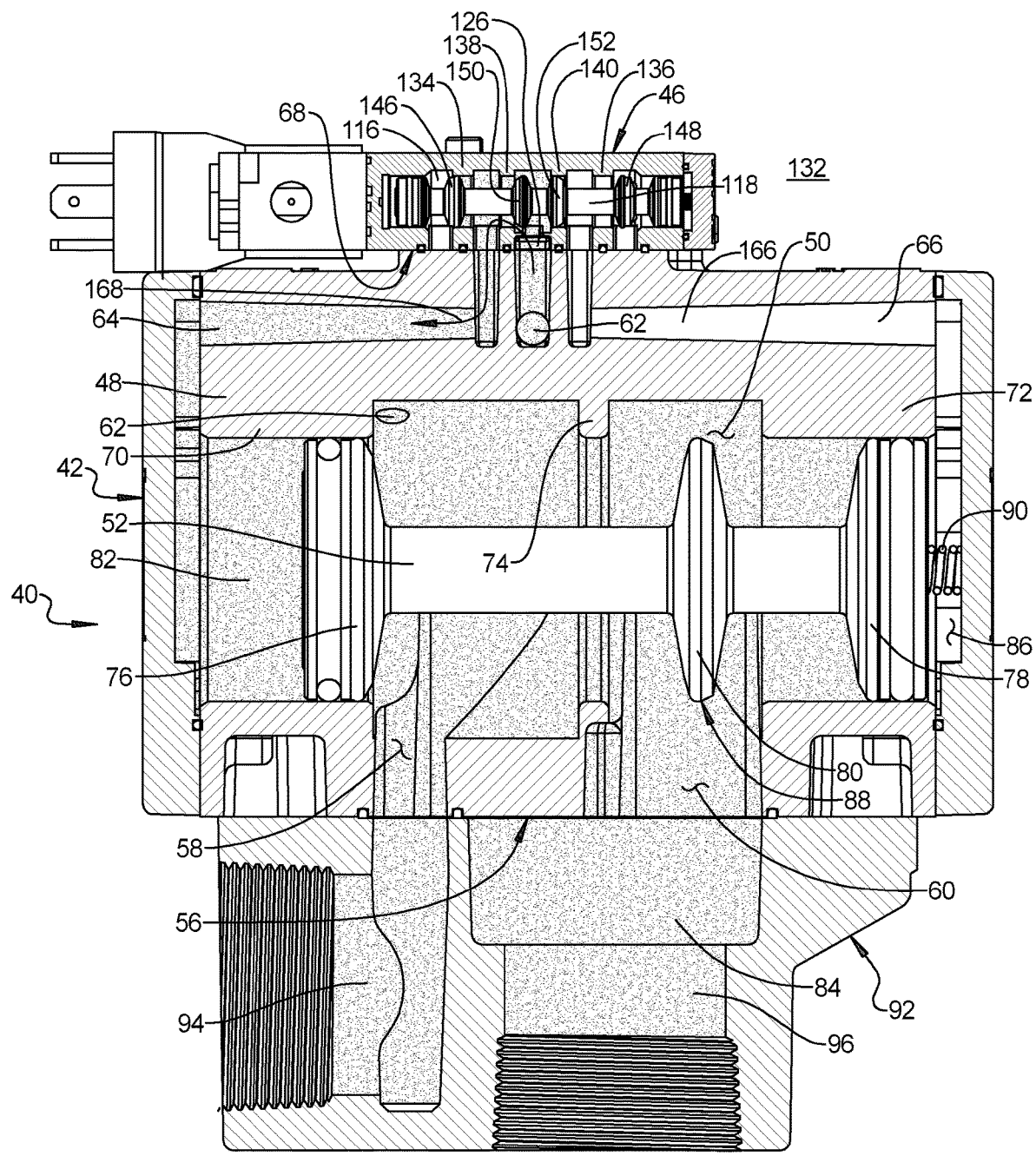
FIG. 6 is a side section view of the exemplary pulse valve assembly illustrated in FIG. 3 where the pulse valve assembly is shown in an open position.

With reference to FIGS. 3-6, a pulse valve assembly 40 is illustrated, which represents an improvement over the design shown in FIGS. 1 and 2. The pulse valve assembly 40 includes a main valve 42, a first pilot valve 44, and a second pilot valve 46. The main valve 42 includes a main valve body 48, a main valve bore 50, and a main valve spool 52. The main valve bore 50 extends within the main valve body 48 along a longitudinal axis 54. The main valve spool 52 is disposed in the main valve bore 50 and can move (i.e., slide) within the main valve bore 50 between a closed position (FIG. 5) and an open position (FIG. 6).

The main valve body 48 has a mounting interface 56 that includes an inlet port 58 and an outlet port 60. The main valve body 48 also includes a pilot inlet passage 62, a normally closed pilot outlet passage 64, and a normally open pilot outlet passage 66. The inlet port 58, outlet port 60, pilot inlet passage 62, normally closed pilot outlet passage 64, and normally open pilot outlet passage 66 are all disposed in fluid communication with the main valve bore 50. More specifically, the inlet port 58 and the outlet port 60 extend from the main valve bore 50 to the mounting interface 56 on the main valve body 48. The pilot inlet passage 62, the normally closed pilot outlet passage 64, and the normally open pilot outlet passage 66 all extend from the main valve bore 50 to a pilot interface 68 on the main valve body 48. The main valve bore 50 of the main valve body 48 includes a first piston seat 70, a second piston seat 72, and a main valve bore surface 74. The second piston seat 72 is longitudinally spaced from the first piston seat 70 and the main valve bore surface 74 is positioned longitudinally between the first and second piston seats 70, 72 and longitudinally between the inlet and outlet ports 58, 60 in the main valve body 48.

The main valve spool 52 includes a first piston 76, a second piston 78, and a main valve member 80. The second piston 78 is longitudinally spaced from the first piston 76 and the main valve member 80 is positioned longitudinally between the first and second pistons 76, 78. The first piston 76 is disposed in sliding contact with the first piston seat 70 when the main valve spool 52 is in the open and closed positions such that the first piston 76 defines a first pressure chamber 82 at one end of the main valve bore 50. The first pressure chamber 82 is disposed in fluid communication with and receives pressurized fluid 84 from the normally closed pilot outlet passage 64. The second piston 78 is disposed in sliding contact with the second piston seat 72 when the main valve spool 52 is in the open and closed positions such that the second piston 78 defines a second pressure chamber 86 at an opposite end of the main valve bore 50. The second pressure chamber 86 is disposed in fluid communication with and receives pressurized fluid 84 from the normally open pilot outlet passage 66. Although the first and second pressure chambers 82, 86 shown in the illustrated embodiment are formed by portions of the main valve bore 50 that are sealed by the first and second pistons 76, 78, alternative arrangements are possible where the first and second pressure chambers 82, 86 are separate from, but disposed in fluid communication with, the main valve bore 50. It should also be appreciated that other embodiments are possible where one of the first pressure chamber 82 or the second pressure chamber 86 is eliminated.

The main valve member 80 includes an abutment surface 88 that contacts the main valve bore surface 74 when the main valve spool 52 is in the closed position (FIG. 5). As a result, the main valve member 80 blocks fluid flow between the inlet port 58 and the outlet port 60 in the main valve body 48 when the main valve spool 52 is in the closed position. In contrast, the main valve member 80 is longitudinally spaced from the main valve bore surface 74 when the main valve spool 52 is in the open position (FIG. 6). As a result, the main valve member 80 permits (i.e., allows) fluid to flow from the inlet port 58 to the outlet port 60 in the main valve body 48 when the main valve spool 52 is in the open position. Optionally, the main valve 42 includes a main valve spring 90 that is disposed in the second pressure chamber 86 of the main valve bore 50. The main valve spring 90 contacts the second piston 78 to bias the main valve spool 52 towards the closed position (FIG. 5). In accordance with this configuration, the main valve 42 acts as a two-way, normally closed valve. However, it should be appreciated that other arrangements are possible than those depicted in the Figures.

With reference to FIGS. 5 and 6, a base 92 may optionally be connected to the mounting interface 56 of the main valve body 48. The base 92 includes an input port 94 and an output port 96. The input port 94 is disposed in fluid communication with the inlet port 58 of the main valve body 48 and is configured to connect to and receive pressurized fluid 84 from a pressurized fluid source (not shown). Examples of pressurized fluid sources include, but are not limited to, storage tanks, pumps, and compressors. The output port 96 is disposed in fluid communication with the outlet port 60 of the main valve body 48 and is configured to connect to and supply pressurized fluid 84 to an accessory device (not shown). Examples of accessory devices include, but are not limited to, nozzles in a dust collector.

As best seen in FIG. 4, the first pilot valve 44 includes a first pilot valve body 98, a first pilot valve bore 100, and a poppet 102. The first pilot valve bore 100 extends within the first pilot valve body 98 along a transverse axis 104 that is perpendicular to the longitudinal axis 54 of the main valve bore 50. The poppet 102 is disposed in the first pilot valve bore 100 and can move (i.e., slide) inside the first pilot valve bore 100 along the transverse axis 104. However, it should be appreciated that other configurations are possible where the first pilot valve 44 is installed at a different location and/or orientation relative to the main valve 42 and the second pilot valve 46. The first pilot valve 44 includes a first pilot inlet 106 for receiving pressurized fluid 84 and one or more outlets 108a, 108b for discharging pressurized fluid 84. In the illustrated embodiment, outlet 108a is normally open and outlet 108b is normally closed. The first pilot inlet 106 may be disposed in fluid communication with and receives pressurized fluid 84 from at least one of the following: the second pilot valve 46, the pilot inlet passage 62, the main valve bore 50, and/or the inlet port 58 in the main valve body 48. Notwithstanding these examples, it should be appreciated that other configurations may be possible.

The first pilot valve 44 includes a solenoid 110 for driving the poppet 102 inside the first pilot valve bore 100 between two or more axially spaced positions. As a result, the position of the poppet 102 in the first pilot valve bore 100 determines whether or not the pressurized fluid 84 can flow from the first pilot inlet 106 to the normally closed outlet 108b of the first pilot valve 44. Optionally, the first pilot valve 44 includes a first pilot valve spring 112 positioned in the first pilot valve bore 100. The first pilot valve spring 112 contacts the poppet 102 to bias the poppet 102 towards one of the axially spaced positions. For example, in the illustrated embodiment, the first pilot valve spring 112 operates to bias the poppet 102 towards the solenoid 110. As a result, the first pilot valve 44 in the illustrated embodiment acts as a normally closed 4-way valve, although other configurations may be possible.

As best seen in FIG. 4, the second pilot valve 46 includes a second pilot valve body 114, a second pilot valve bore 116, and a pilot valve spool 118. The second pilot valve body 114 is connected to the pilot interface 68 of the main valve body 48. The second pilot valve bore 116 extends within the second pilot valve body 114 along a parallel axis 120 that is parallel to and spaced from the longitudinal axis 54 of the main valve bore 50. The pilot valve spool 118 is disposed in the second pilot valve bore 116 and can move (i.e., slide) inside the second pilot valve bore 116 along the parallel axis 120 between a first position and a second position. In the first position, the pilot valve spool 118 is shifted towards the first pilot valve 44 (i.e., towards the left in the Figures). In the second position, the pilot valve spool 118 is shifted away from the first pilot valve 44 (i.e., towards the right in the Figures). However, it should be appreciated that this convention may change in embodiments where the first pilot valve 44 is installed in a different location or orientation. The second pilot valve body 114 includes a first exhaust port 122, a second exhaust port 124, a second pilot inlet 126, a normally closed pilot outlet port 128, and a normally open pilot outlet port 130. The first and second exhaust ports 122, 124 are vented to the surrounding atmosphere 132. The second pilot inlet 126 is longitudinally positioned between the first and second exhaust ports 122, 124 and is disposed in fluid communication with the pilot inlet passage 62. The normally closed pilot outlet port 128 is longitudinally positioned between the first exhaust port 122 and the second pilot inlet 126 and is disposed in fluid communication with the normally closed pilot outlet passage 64. The normally open pilot outlet port 130 is longitudinally positioned between the second exhaust port 124 and the second pilot inlet 126 and is disposed in fluid communication with the normally open pilot outlet passage 66.

The second pilot valve bore 116 includes a first exhaust port valve seat 134, a second exhaust port valve seat 136, a first valve seat 138, and a second valve seat 140. The first exhaust port valve seat 134 is longitudinally positioned between the first exhaust port 122 and the normally closed pilot outlet port 128. The second exhaust port valve seat 136 is longitudinally positioned between the second exhaust port 124 and the normally open pilot outlet port 130. The first valve seat 138 is longitudinally positioned between the normally closed pilot outlet port 128 and the second pilot inlet 126. The second valve seat 140 is longitudinally positioned between the normally open pilot outlet port 130 and the second pilot inlet 126.

The pilot valve spool 118 includes a first valve head 142, a second valve head 144, a first exhaust port valve member 146, a second exhaust port valve member 148, a first valve member 150, and a second valve member 152. The second valve head 144 of the pilot valve spool 118 is longitudinally spaced from the first valve head 142. The first and second valve heads 142, 144 are disposed in sliding contact with the second pilot valve bore 116 when the pilot valve spool 118 is in the first and second positions such that the first valve head 142 defines a first end chamber 154 within the second pilot valve bore 116 and the second valve head 144 defines a second end chamber 156 within the second pilot valve bore 116. The first pilot valve 44 is connected to the second pilot valve body 114 with at least one of the first and second end chambers 154, 156 disposed in fluid communication with the normally closed outlet 108b of the first pilot valve 44 such that pressurized fluid 84 from the first pilot valve 44 drives the pilot valve spool 118 of the second pilot valve 46 between the first and second positions. Optionally, a second pilot valve spring 158 is disposed in the second end chamber 156 of the second pilot valve bore 116. The second pilot valve spring 158 contacts the second valve head 144 to bias the pilot valve spool 118 towards the first position. As a result, the second pilot valve 46 in the illustrated embodiment acts as a normally closed 4-way valve, although other configurations may be possible.

In the illustrated example, the first and second exhaust port valve members 146, 148 are positioned longitudinally between the first and second valve heads 142, 144. The first and second valve members 150, 152 are positioned longitudinally between the first and second exhaust port valve members 146, 148. However, it should be appreciated that other configurations of the pilot valve spool 118 are possible without departing from the scope of the subject disclosure. The first pilot valve bore 100 has a first pilot diameter 160, the second pilot valve bore 116 has a second pilot diameter 162, and the main valve bore 50 has a main valve diameter 164. Although other configurations are possible, in the illustrated embodiment, the first pilot diameter 160 is smaller than the second pilot diameter 162 and the second pilot diameter 162 is smaller than the main valve diameter 164. As a result, pressurized fluid 84 from the smaller first pilot valve 44 (i.e., the solenoid operated pilot valve) operates the larger second pilot valve 46 and pressurized fluid 84 from the second pilot valve 46 operates the larger main valve 42. Advantageously, this arrangement yields faster response times for the main valve 42 in comparison to prior pulse valve designs, which results in more cleaning energy per pulse.

When the pilot valve spool 118 is in the first position (FIG. 5), the first valve member 150 is disposed in contact with the first valve seat 138, the second exhaust port valve member 148 is disposed in contact with the second exhaust port valve seat 136, the second valve member 152 is longitudinally spaced from the second valve seat 140, and the first exhaust port valve member 146 is longitudinally spaced from the first exhaust port valve seat 134 to define a first fluid flow path 166 in the second pilot valve 46. The first fluid flow path 166 extends from the second pilot inlet 126, through part of the second pilot valve bore 116, and into the normally open pilot outlet passage 66. At the same time, the normally closed pilot outlet passage 64 is vented to the surrounding atmosphere 132 when the pilot valve spool 118 is in the first position.

When the pilot valve spool 118 is in the second position (FIG. 6), the second valve member 152 is disposed in contact with the second valve seat 140, the first exhaust port valve member 146 is disposed in contact with the first exhaust port valve seat 134, the first valve member 150 is longitudinally spaced from the first valve seat 138, and the second exhaust port valve member 148 is longitudinally spaced from the second exhaust port valve seat 136 to define a second fluid flow path 168 in the second pilot valve 46. The second fluid flow path 168 extends from the second pilot inlet 126, through part of the second pilot valve bore 116, and into the normally closed pilot outlet passage 64. At the same time, the normally open pilot outlet passage 66 is vented to the surrounding atmosphere 132 when the pilot valve spool 118 is in the second position.

FIG. 5 illustrates the pulse valve assembly 40 when the main valve spool 52 is in the closed position and the pilot valve spool 118 of the second pilot valve 46 is in the first position. In this state, pressurized fluid 84 enters the base 92 through the input port 94, passes through the inlet port 58 in the main valve body 48, and enters the portion of the main valve bore 50 positioned longitudinally between the first piston 76 and the main valve member 80. The solenoid 110 of the first pilot valve 44 is de-energized so the pilot valve spool 118 of the second pilot valve 46 is in the first position. Some of the pressurized fluid 84 in the main valve bore 50 enters the pilot inlet passage 62 in the main valve body 48, passes through the second pilot inlet 126, enters the portion of the second pilot valve bore 116 positioned longitudinally between the first valve member 150 and the second exhaust port valve member 148 of the pilot valve spool 118, travels along the first fluid flow path 166, and enters the normally open pilot outlet passage 66 in the main valve body 48. The pressurized fluid 84 thus accumulates in the second pressure chamber 86 in the main valve bore 50, which in combination with the main valve spring 90, holds the main valve spool 52 in the closed position. In the closed position, the abutment surface 88 of the main valve member 80 is positioned in contact with the main valve bore surface 74. Accordingly, the pressurized fluid 84 entering the main valve bore 50 from the inlet port 58 is blocked by the main valve member 80 and cannot flow into the outlet port 60 in the main valve body 48 and thus the output port 96 in the base 92.

FIG. 6 illustrates the pulse valve assembly 40 when the main valve spool 52 is in the open position and the pilot valve spool 118 of the second pilot valve 46 is in the second position. In this state, pressurized fluid 84 enters the base 92 through the input port 94, passes through the inlet port 58 in the main valve body 48, and enters the portion of the main valve bore 50 positioned longitudinally between the first and second pistons 76, 78. The solenoid 110 of the first pilot valve 44 is energized so pressurized fluid 84 from the normally closed outlet 108b of the first solenoid 110 enters the first end chamber 154 in the second pilot valve bore 116, causing the pilot valve spool 118 of the second pilot valve 46 to move to the second position. Some of the pressurized fluid 84 in the main valve bore 50 enters the pilot inlet passage 62 in the main valve body 48, passes through the second pilot inlet 126, enters the portion of the second pilot valve bore 116 positioned longitudinally between the second valve member 152 and the first exhaust port valve member 146 of the pilot valve spool 118, travels along the second fluid flow path 168, and enters the normally closed pilot outlet passage 64 in the main valve body 48. The pressurized fluid 84 thus accumulates in the first pressure chamber 82 in the main valve bore 50, which pushes the main valve spool 52 to the open position. In the open position, the abutment surface 88 of the main valve member 80 is spaced from the main valve bore surface 74. Accordingly, the pressurized fluid 84 entering the main valve bore 50 from the inlet port 58 can flow into the outlet port 60 in the main valve body 48 and into the output port 96 in the base 92 as a pulse of pressurized fluid 84.

Figure 7:
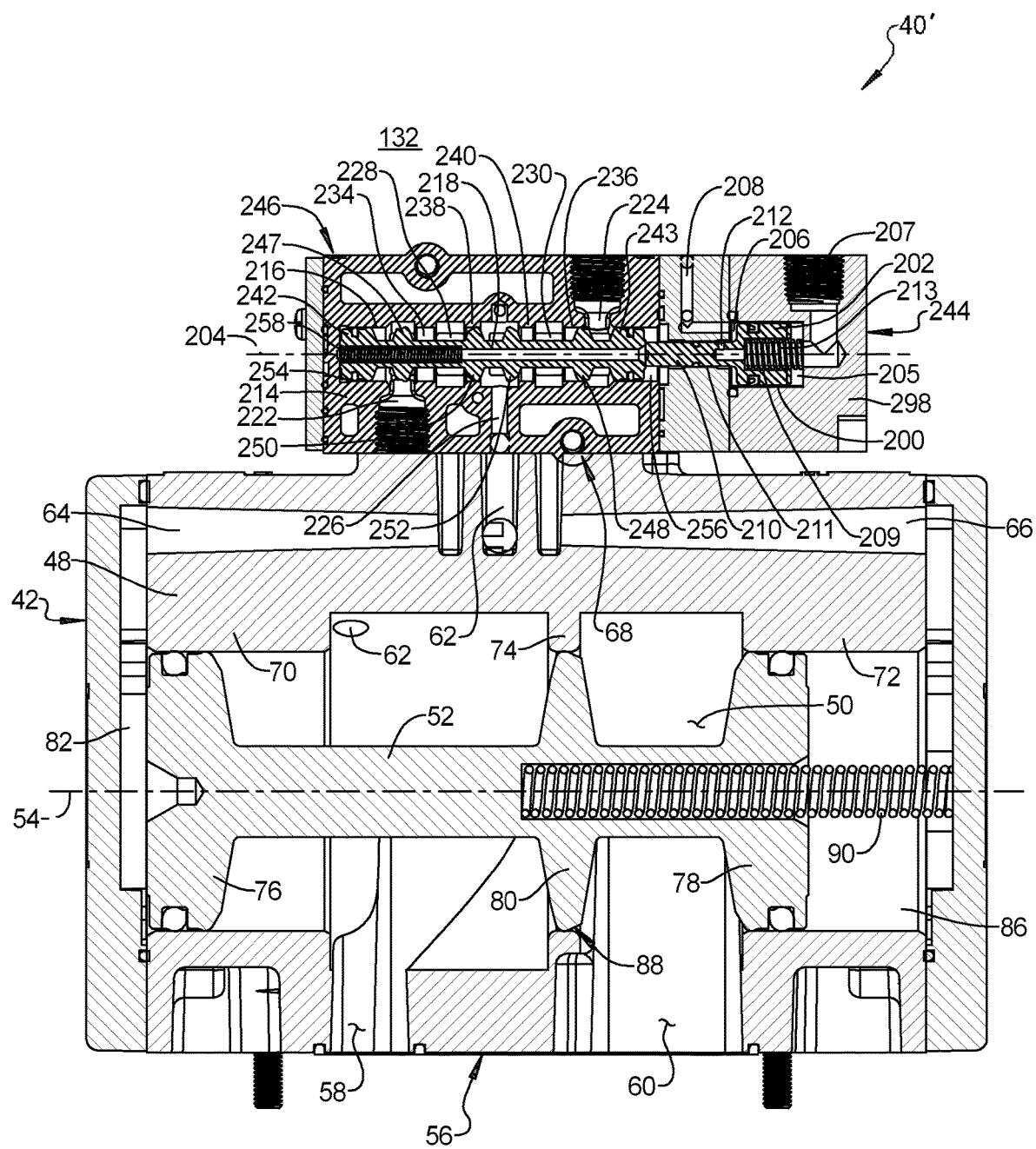
FIG. 7 is a side section view of another exemplary pulse valve assembly constructed in accordance with the teachings of the present disclosure.

FIG. 7 illustrates another pulse valve assembly 40'. The pulse valve assembly 40' shown in FIG. 7 has substantially the same structure and function as the pulse valve assembly 40 illustrated in FIGS. 3-6, except that first and second pressure-actuated pilot valves 244, 246 in FIG. 7 replace the solenoid-actuated pilot valves 44, 46 shown in FIGS. 3-6.

The first pressure-actuated pilot valve 244 includes a first pilot valve body 298, a first pilot valve bore 200, and a poppet 202. The first pilot valve bore 200 extends within the first pilot valve body 298 along axis 204 that is parallel to the longitudinal axis 54 of the main valve bore 50. The poppet 202 is disposed in the first pilot valve bore 200 and can move (i.e., slide) inside the first pilot valve bore 200 along axis 204. However, it should be appreciated that other configurations are possible where the first pressure-actuated pilot valve 244 is installed at a different location and/or orientation relative to the main valve 42 and the second pressure-actuated pilot valve 246. The poppet 202 separates/divides the first pilot valve bore 200 into a first working chamber 205 and a second working chamber 206. In accordance with the configuration shown in FIG. 7, pressure differentials between the first and second working chambers 205, 206 drive the sliding movement of the poppet 202 along axis 204.

The first pressure-actuated pilot valve 244 includes a pressure release port 207 that is disposed in fluid communication with the first working chamber 205 of the first pilot valve bore 200. An external valve (not shown), connected to the pressure release port 207, is configured to release pressurized fluid 84 (e.g., air) from the first working chamber 205 of the first pilot valve bore 200 to the surrounding atmosphere 132. In other words, air can be removed from the first working chamber 205 of the first pilot valve bore 200 via the pressure release port 207. A bleed passage 208 disposed in fluid communication with the second working chamber 206 in the first pilot valve bore 200 extends through the first pilot valve body 298. The bleed passage 208 is connected in fluid communication with the pilot inlet passage 62 for receiving pressurized fluid 84 therefrom. The poppet 202 includes an internal bore 209 that is open to the first working chamber 205 and a stem 210 of reduced diameter that extends parallel to axis 204. The stem 210 of the poppet 202 is slidingly received in a reduced diameter portion 211 of the first pilot valve bore 200. The poppet 202 includes a bleed hole 212 that communicates fluid between the second working chamber 206 and the internal bore 209 of the poppet 202 and thus the first working chamber 205. Optionally, a first pilot valve spring 213 received in the internal bore 209 of the poppet 202 and the first working chamber 205 biases the poppet 202 away from the pressure release port 207 and towards the second pressure-actuated pilot valve 246.

The second pressure-actuated pilot valve 246 includes a second pilot valve body 214, a second pilot valve bore 216, and a pilot valve spool 218. The second pilot valve body 214 is connected to the pilot interface 68 of the main valve body 48. The second pilot valve bore 216 extends within the second pilot valve body 214 along axis 204. The pilot valve spool 218 is disposed in the second pilot valve bore 216 and can move (i.e., slide) inside the second pilot valve bore 216 along axis 204 between a first position and a second position. In the first position, the pilot valve spool 218 is shifted away from the first pressure-actuated pilot valve 244 (i.e., towards the left in the Figures). In the second position, the pilot valve spool 218 is shifted towards the first pressure-actuated pilot valve 244 (i.e., towards the right in the Figures). However, it should be appreciated that this convention may change in embodiments where the first pressure-actuated pilot valve 244 is installed in a different location or orientation. The second pilot valve body 214 includes a first exhaust port 222, a second exhaust port 224, a second pilot inlet 226, a normally closed pilot outlet port 228, and a normally open pilot outlet port 230. The first and second exhaust ports 222, 224 are vented to the surrounding atmosphere 132. The second pilot inlet 226 is longitudinally positioned between the first and second exhaust ports 222, 224 and is disposed in fluid communication with the pilot inlet passage 62. The normally closed pilot outlet port 228 is longitudinally positioned between the first exhaust port 222 and the second pilot inlet 226 and is disposed in fluid communication with the normally closed pilot outlet passage 64. The normally open pilot outlet port 230 is longitudinally positioned between the second exhaust port 224 and the second pilot inlet 226 and is disposed in fluid communication with the normally open pilot outlet passage 66.

The second pilot valve bore 216 includes a first exhaust port valve seat 234, a second exhaust port valve seat 236, a first valve seat 238, and a second valve seat 240. The first exhaust port valve seat 234 is longitudinally positioned between the first exhaust port 222 and the normally closed pilot outlet port 228. The second exhaust port valve seat 236 is longitudinally positioned between the second exhaust port 224 and the normally open pilot outlet port 230. The first valve seat 238 is longitudinally positioned between the normally closed pilot outlet port 228 and the second pilot inlet 226. The second valve seat 240 is longitudinally positioned between the normally open pilot outlet port 230 and the second pilot inlet 226.

The pilot valve spool 218 includes a first valve head 242, a second valve head 243, a first exhaust port valve member 247, a second exhaust port valve member 248, a first valve member 250, and a second valve member 252. The second valve head 243 of the pilot valve spool 218 is longitudinally spaced from the first valve head 242. The first and second valve heads 242, 243 are disposed in sliding contact with the second pilot valve bore 216 when the pilot valve spool 218 is in the first and second positions such that the first valve head 242 defines a first end chamber 254 within the second pilot valve bore 216 and the second valve head 243 defines a second end chamber 256 within the second pilot valve bore 216. The first pressure-actuated pilot valve 244 is connected to the second pilot valve body 214 such that the stem 210 of the poppet 202 extends into the second end chamber 256 and contacts the second valve head 243 of the pilot valve spool 218. Accordingly, axial movement of the poppet 202 of the first pressure-actuated pilot valve 244 along axis 204 drives the pilot valve spool 118 of the second pressure-actuated pilot valve 246 between the first and second positions. Optionally, a second pilot valve spring 258 is disposed in the first end chamber 254 of the second pilot valve bore 216. The second pilot valve spring 258 contacts the first valve head 242 to bias the pilot valve spool 218 towards the second position. Although other configurations are possible, in the illustrated example, the first pilot valve spring 213 is stiffer than the second pilot valve spring 258 such that the poppet 202 of the first pressure-actuated pilot valve 244 normally biases the pilot valve spool 118 of the second pressure-actuated pilot valve 246 in the first position. Optionally, the second pilot valve spring 258 may be received in a pressure equalization passage 260 that extends through the pilot valve spool 218 along axis 204 between the first and second valve heads 242, 243. The pressure equalization passage 260 is configured to transport fluid between the first and second end chambers 254, 256 and thus equalize pressure between the first and second end chambers 254, 256.

It should be appreciated that the second pressure-actuated pilot valve 246 in the illustrated embodiment acts as a normally closed 4-way valve, although other configurations may be possible. In the illustrated example, the first and second exhaust port valve members 247, 248 are positioned longitudinally between the first and second valve heads 242, 243. The first and second valve members 250, 252 are positioned longitudinally between the first and second exhaust port valve members 247, 248. However, it should be appreciated that other configurations of the pilot valve spool 218 are possible without departing from the scope of the subject disclosure. As will be explained below, pressurized fluid 84 from the second pressure-actuated pilot valve 246 operates the larger main valve 42.

When the pilot valve spool 218 is in the first position, the first valve member 250 is disposed in contact with the first valve seat 238, the second exhaust port valve member 248 is disposed in contact with the second exhaust port valve seat 236, the second valve member 252 is longitudinally spaced from the second valve seat 240, and the first exhaust port valve member 247 is longitudinally spaced from the first exhaust port valve seat 234 to define a first fluid flow path in the second pressure-actuated pilot valve 246. The first fluid flow path extends from the second pilot inlet 226, through part of the second pilot valve bore 216, and into the normally open pilot outlet passage 66. At the same time, the normally closed pilot outlet passage 64 is vented to the surrounding atmosphere 132 when the pilot valve spool 218 is in the first position.

When the pilot valve spool 218 is in the second position, the second valve member 252 is disposed in contact with the second valve seat 240, the first exhaust port valve member 247 is disposed in contact with the first exhaust port valve seat 234, the first valve member 250 is longitudinally spaced from the first valve seat 238, and the second exhaust port valve member 248 is longitudinally spaced from the second exhaust port valve seat 236 to define a second fluid flow path in the second pressure-actuated pilot valve 246. The second fluid flow path extends from the second pilot inlet 226, through part of the second pilot valve bore 216, and into the normally closed pilot outlet passage 64. At the same time, the normally open pilot outlet passage 66 is vented to the surrounding atmosphere 132 when the pilot valve spool 218 is in the second position.

The main valve spool 52 of the pulse valve assembly 40 moves to the closed position when the pilot valve spool 218 of the second pressure-actuated pilot valve 246 is in the first position. In this state, pressurized fluid 84 enters the base 92 through the input port 94, passes through the inlet port 58 in the main valve body 48, and enters the portion of the main valve bore 50 positioned longitudinally between the first piston 76 and the main valve member 80. The first pilot valve spring 213 pushes the poppet 202 of the first pressure-actuated pilot valve 244 towards the second pressure-actuated pilot valve 246 and holds the pilot valve spool 218 of the second pilot valve 246 in the first position. Some of the pressurized fluid 84 in the main valve bore 50 enters the pilot inlet passage 62 in the main valve body 48, passes through the second pilot inlet 226, enters the portion of the second pilot valve bore 216 positioned longitudinally between the first valve member 250 and the second exhaust port valve member 248 of the pilot valve spool 218, travels along the first fluid flow path, and enters the normally open pilot outlet passage 66 in the main valve body 48. The pressurized fluid 84 thus accumulates in the second pressure chamber 86 in the main valve bore 50, which in combination with the main valve spring 90, holds the main valve spool 52 in the closed position. In the closed position, the abutment surface 88 of the main valve member 80 is positioned in contact with the main valve bore surface 74. Accordingly, the pressurized fluid 84 entering the main valve bore 50 from the inlet port 58 is blocked by the main valve member 80 and cannot flow into the outlet port 60 in the main valve body 48 and thus the output port 96 in the base 92.

The main valve spool 52 of the pulse valve assembly 40 moves to the open position when the pilot valve spool 218 of the second pressure-actuated pilot valve 246 is in the second position. In this state, pressurized fluid 84 enters the base 92 through the input port 94, passes through the inlet port 58 in the main valve body 48, and enters the portion of the main valve bore 50 positioned longitudinally between the first and second pistons 76, 78. Pressurized fluid 84 in the first working chamber 205 is released through the pressure release port 207 causing a pressure differential across the poppet 202 that forces the poppet 202 away from the second pressure-actuated valve 246. The pressure in the second working chamber 206 and the biasing force of the second pilot valve spring 258 causes the pilot valve spool 218 of the second pilot valve 246 to move to the second position. Some of the pressurized fluid 84 in the main valve bore 50 enters the pilot inlet passage 62 in the main valve body 48, passes through the second pilot inlet 226, enters the portion of the second pilot valve bore 216 positioned longitudinally between the second valve member 252 and the first exhaust port valve member 247 of the pilot valve spool 218, travels along the second fluid flow path, and enters the normally closed pilot outlet passage 64 in the main valve body 48. The pressurized fluid 84 thus accumulates in the first pressure chamber 82 in the main valve bore 50, which pushes the main valve spool 52 to the open position. In the open position, the abutment surface 88 of the main valve member 80 is spaced from the main valve bore surface 74. Accordingly, the pressurized fluid 84 entering the main valve bore 50 from the inlet port 58 can flow into the outlet port 60 in the main valve body 48 and into the output port 96 in the base 92 as a pulse of pressurized fluid 84.

Many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A pulse valve assembly comprising:
   a main valve including a main valve body, a main valve bore extending within said main valve body, and a main valve spool slidingly disposed in said main valve bore for movement between a closed position and an open position;
   said main valve body including an inlet port, an outlet port, and a pilot inlet passage, each disposed in fluid communication with said main valve bore;
   said main valve body having at least one pressure chamber at one end of said main valve bore and at least one pilot outlet passage disposed in fluid communication with said at least one pressure chamber;
   said main valve spool including a main valve member configured to block fluid flow between said inlet port and said outlet port when said main valve spool is in said closed position and permit fluid flow from said inlet port to said outlet port when said main valve spool is in said open position;
   a first pilot valve including a first pilot valve body, a first pilot valve bore extending within said first pilot valve body, and a poppet slidingly disposed in said first pilot valve bore for movement between at least two axially spaced positions;
   a second pilot valve including a second pilot valve body connected to said main valve body, a second pilot valve bore extending within said second pilot valve body, and a pilot valve spool slidingly disposed in said second pilot valve bore for movement between a first position and a second position;
   said second pilot valve body including at least one end chamber at one end of said second pilot valve bore, a second pilot inlet disposed in fluid communication with said pilot inlet passage, and at least one outlet port disposed in fluid communication with said at least one pilot outlet passage;
   said first pilot valve connected to said second pilot valve such that said first pilot valve drives movement of said pilot valve spool of said second pilot valve between said first and second positions; and
   said pilot valve spool of said second pilot valve including at least one valve member configured to open and close at least one fluid flow path extending from said second pilot inlet to said at least one pilot outlet passage when said pilot valve spool moves back and forth between said first and second positions.

2. The pulse valve assembly set forth in claim 1, wherein said pressurized fluid accumulates in said at least one pressure chamber in said main valve body when said pressurized fluid flows through said at least one fluid flow path in said second pilot valve to force said main valve spool towards one of said open and closed positions.

3. The pulse valve assembly set forth in claim 2, wherein said first pilot valve includes a first pilot inlet that is disposed in fluid communication with said second pilot inlet of said second pilot valve.

4. The pulse valve assembly set forth in claim 2, wherein said first pilot valve includes a first pilot inlet that is disposed in fluid communication with said pilot inlet passage in said main valve body.

5. The pulse valve assembly set forth in claim 2, wherein said first pilot valve includes a first pilot inlet that is disposed in fluid communication with said main valve bore in said main valve body.

6. The pulse valve assembly set forth in claim 1, further comprising:
   a base connected to said main valve body at a mounting interface, said base including an input port and an output port, wherein said input port is disposed in fluid communication with said inlet port of said main valve body and is configured to connect to and receive said pressurized fluid from a pressurized fluid source, and wherein said output port is disposed in fluid communication with said outlet port of said main valve body and is configured to connect to and supply said pressurized fluid to an accessory device.

7. The pulse valve assembly set forth in claim 6, wherein said accessory device is a nozzle in a dust collector that is configured to impart a pulse of said pressurized fluid to at least one filter element of said dust collector to blow dust off of said at least one filter element.

8. The pulse valve assembly set forth in claim 1, wherein said poppet of said first pilot valve divides said first pilot valve bore into first and second working chambers and wherein said first pilot valve body includes a pressure release port for releasing pressurized fluid from at least one of said first and second working chambers to create a pressure differential across said poppet that causes said poppet to move between at least two axially spaced positions.

9. The pulse valve assembly set forth in claim 8, wherein said poppet of said first pilot valve includes a stem that contacts said pilot valve spool of said second pilot valve such that movement of said poppet between at least two axially spaced positions causes said pilot valve spool to move between said first and second positions.

10. The pulse valve assembly set forth in claim 1, wherein said first pilot valve includes a first pilot inlet for receiving pressurized fluid, at least one outlet for discharging said pressurized fluid, and a solenoid for driving said poppet between at least two axially spaced positions and wherein said second pilot valve includes at least one chamber at one end of said second pilot valve bore that is disposed in fluid communication with said at least one outlet of said first pilot valve such that said pressurized fluid from said first pilot valve drives said pilot valve spool of said second pilot valve between said first and second positions.

11. The pulse valve assembly set forth in claim 1, wherein said main valve includes a main valve spring that biases said main valve spool towards said closed position, said first pilot valve includes a first pilot valve spring that biases said poppet towards one of said at least two axially spaced positions, and said second pilot valve includes a second pilot valve spring that biases said pilot valve spool towards one of said first and second positions.

12. A pulse valve assembly comprising:
a main valve including a main valve body, a main valve bore extending within said main valve body, and a main valve spool slidingly disposed in said main valve bore for movement between a closed position and an open position;
said main valve body including an inlet port, an outlet port, and a pilot inlet passage, each disposed in fluid communication with said main valve bore;
said main valve body having a first pressure chamber at one end of said main valve bore, a second pressure chamber at an opposite end of said main valve bore, a normally closed pilot outlet passage disposed in fluid communication with said first pressure chamber, and a normally open pilot outlet passage disposed in fluid communication with said second pressure chamber;
said main valve spool including a main valve member configured to block fluid flow between said inlet port and said outlet port when said main valve spool is in said closed position and permit fluid flow from said inlet port to said outlet port when said main valve spool is in said open position;
a first pilot valve including a first pilot valve body, a first pilot valve bore extending within said first pilot valve body, a poppet slidingly disposed in said first pilot valve bore, a first pilot inlet for receiving pressurized fluid, at least one outlet for discharging said pressurized fluid, and a solenoid for driving said poppet between at least two axially spaced positions;
a second pilot valve including a second pilot valve body, a second pilot valve bore extending within said second pilot valve body, and a pilot valve spool slidingly disposed in said second pilot valve bore for movement between a first position and a second position;
said second pilot valve body including at least one chamber at one end of said second pilot valve bore, a second pilot inlet disposed in fluid communication with said pilot inlet passage, a normally closed pilot outlet port disposed in fluid communication with said normally closed pilot outlet passage, and a normally open pilot outlet port disposed in fluid communication with said normally open pilot outlet passage;
said at least one end chamber of said second pilot valve disposed in fluid communication with said at least one outlet of said first pilot valve such that said pressurized fluid from said first pilot valve drives said pilot valve spool of said second pilot valve between said first and second positions; and
said pilot valve spool of said second pilot valve including at least one valve member configured to provide a first fluid flow path extending from said second pilot inlet to said normally open pilot outlet passage when said pilot valve spool is in said first position and a second fluid flow path extending from said second pilot inlet to said normally closed pilot outlet passage when said pilot valve spool is in said second position.

13. The pulse valve assembly set forth in claim 12, wherein said pressurized fluid accumulates in said second pressure chamber in said main valve body when said pressurized fluid flows through said first fluid flow path in said second pilot valve to force said main valve spool towards said closed position and wherein said pressurized fluid accumulates in said first pressure chamber in said main valve body when said pressurized fluid flows through said second fluid flow path in said second pilot valve to force said main valve spool towards said open position.

14. The pulse valve assembly set forth in claim 13, wherein said second pilot valve bore includes a first valve seat longitudinally positioned between said normally closed pilot outlet port and said second pilot inlet and a second valve seat longitudinally positioned between said normally open pilot outlet port and said second pilot inlet, wherein said at least one valve member of said pilot valve spool includes a first valve member and a second valve member, wherein said first valve member contacts said first valve seat while said second valve member is longitudinally spaced from said second valve seat when said pilot valve spool is in said first position, and wherein said second valve member contacts said second valve seat while said first valve member is longitudinally spaced from said first valve seat when said pilot valve spool is in said second position.

15. The pulse valve assembly set forth in claim 14, wherein said pilot valve spool includes a first valve head and a second valve head that is longitudinally spaced from said first valve head with said first and second valve members positioned longitudinally between said first and second valve heads, said first and second valve heads disposed in sliding contact with said second pilot valve bore when said pilot valve spool is in said first and second positions.

16. The pulse valve assembly set forth in claim 15, wherein said pilot valve spool includes first and second exhaust port valve members positioned longitudinally between said first and second valve heads, wherein said second pilot valve body includes first and second exhaust ports that are vented to a surrounding atmosphere, and wherein said second pilot valve bore includes a first exhaust port valve seat longitudinally positioned between said first exhaust port and said normally closed pilot outlet port and a second exhaust port valve seat longitudinally positioned between said second exhaust port and said normally open pilot outlet port.

17. The pulse valve assembly set forth in claim 16, wherein said second exhaust port valve member is disposed in contact with said second exhaust port valve seat while said first exhaust port valve member is longitudinally spaced from said first exhaust port valve seat to vent said normally closed pilot outlet passage to the surrounding atmosphere when said pilot valve spool is in said first position and wherein said first exhaust port valve member is disposed in contact with said first exhaust port valve seat while said second exhaust port valve member is longitudinally spaced from said second exhaust port valve seat to vent said normally open pilot outlet passage to the surrounding atmosphere when said pilot valve spool is in said second position.

18. A pulse valve assembly comprising:
- a main valve including a main valve body, a main valve bore extending within said main valve body along a longitudinal axis, and a main valve spool slidingly disposed in said main valve bore for movement between a closed position and an open position;
- said main valve body including an inlet port, an outlet port, a pilot inlet passage, a normally closed pilot outlet passage, and a normally open pilot outlet passage, each disposed in fluid communication with said main valve bore;
- said main valve bore of said main valve body including a first piston seat, a second piston seat that is longitudinally spaced from said first piston seat, and a main valve bore surface positioned longitudinally between said first and second piston seats and longitudinally between said inlet and outlet ports;
- said main valve spool including a first piston, a second piston longitudinally spaced from said first piston, and a main valve member positioned longitudinally between said first and second pistons;
- said first piston disposed in sliding contact with said first piston seat when said main valve spool is in said open and closed positions such that said first piston defines a first pressure chamber within said main valve bore that is disposed in fluid communication with and receives pressurized fluid from said normally closed pilot outlet passage;
- said second piston disposed in sliding contact with said second piston seat when said main valve spool is in said open and closed positions such that said second piston defines a second pressure chamber within said main valve bore that is disposed in fluid communication with and receives pressurized fluid from said normally open pilot outlet passage;
- said main valve member including an abutment surface that contacts said main valve bore surface when said main valve spool is in said closed position to block fluid flow between said inlet port and said outlet port in said main valve body and that is longitudinally spaced from said main valve bore surface when said main valve spool is in said open position to allow fluid flow from said inlet port to said outlet port in said main valve body;
- a first pilot valve including a first pilot valve body, a first pilot valve bore extending within said first pilot valve body, a poppet slidingly disposed in said first pilot valve bore, a first pilot inlet for receiving pressurized fluid, at least one outlet for discharging said pressurized fluid, and a solenoid for driving said poppet between at least two axially spaced positions;
- a second pilot valve including a second pilot valve body connected to said main valve body, a second pilot valve bore extending within said second pilot valve body, and a pilot valve spool slidingly disposed in said second pilot valve bore for movement between a first position and a second position;
- said second pilot valve body including a first end chamber at one end of said second pilot valve bore, a second end chamber at an opposite end of said second pilot valve bore, a second pilot inlet that is disposed in fluid communication with said pilot inlet passage, a normally closed pilot outlet port that is disposed in fluid communication with said normally closed pilot outlet passage, and a normally open pilot outlet port that is disposed in fluid communication with said normally open pilot outlet passage;
- said second pilot valve bore including a first valve seat longitudinally positioned between said normally closed pilot outlet port and said second pilot inlet and a second valve seat longitudinally positioned between said normally open pilot outlet port and said second pilot inlet;
- said first pilot valve connected to said second pilot valve body with at least one of said first and second end chambers being disposed in fluid communication with said at least one outlet of said first pilot valve such that pressurized fluid from said first pilot valve drives said pilot valve spool of said second pilot valve between said first and second positions;
- said pilot valve spool including first and second valve members,
- said first valve member disposed in contact with said first valve seat while said second valve member is longitudinally spaced from said second valve seat when said pilot valve spool is in said first position to define a first fluid flow path extending from said second pilot inlet to said normally open pilot outlet passage; and
- said second valve member disposed in contact with said second valve seat while said first valve member is longitudinally spaced from said first valve seat when said pilot valve spool is in said second position to define a second fluid flow path extending from said second pilot inlet to said normally closed pilot outlet passage.

19. The pulse valve assembly set forth in claim 18, wherein said pressurized fluid accumulates in said second pressure chamber in said main valve body when said pressurized fluid flows through said first fluid flow path in said second pilot valve to force said main valve spool towards said closed position and wherein said pressurized fluid accumulates in said first pressure chamber in said main valve body when said pressurized fluid flows through said second fluid flow path in said second pilot valve to force said main valve spool towards said open position.

20. The pulse valve assembly set forth in claim 18, wherein said first pilot inlet of said first pilot valve is disposed in fluid communication with at least one of said second pilot inlet of said second pilot valve, said pilot inlet passage in said main valve body, and said main valve bore in said main valve body.

* * * * *